United States Patent
Zhou

(10) Patent No.: US 9,898,183 B1
(45) Date of Patent: Feb. 20, 2018

(54) MOTIONS FOR OBJECT RENDERING AND SELECTION

(71) Applicant: Amazon Technologies, Inc., Reno, NV (US)

(72) Inventor: Doug Zhou, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 705 days.

(21) Appl. No.: 13/622,914

(22) Filed: Sep. 19, 2012

(51) Int. Cl.
  *G06F 3/0488* (2013.01)

(52) U.S. Cl.
  CPC .................. *G06F 3/0488* (2013.01)

(58) Field of Classification Search
  CPC .............. G06F 3/0488; G06F 3/0421
  See application file for complete search history.

(56) References Cited

U.S. PATENT DOCUMENTS

| | | | | |
|---|---|---|---|---|
| 9,152,317 | B2* | 10/2015 | Larco | G06F 3/0482 |
| 2006/0253802 | A1* | 11/2006 | Kim | G06F 3/04815 |
| | | | | 715/836 |
| 2006/0284874 | A1* | 12/2006 | Wilson | 345/473 |
| 2008/0273755 | A1* | 11/2008 | Hildreth | G06F 1/1626 |
| | | | | 382/103 |
| 2010/0093400 | A1* | 4/2010 | Ju et al. | 455/566 |
| 2010/0300771 | A1* | 12/2010 | Miyazaki | 178/18.03 |
| 2010/0315417 | A1* | 12/2010 | Cho et al. | 345/419 |
| 2011/0185308 | A1* | 7/2011 | MacHida | 715/784 |
| 2011/0267265 | A1* | 11/2011 | Stinson | 345/157 |
| 2011/0321097 | A1* | 12/2011 | DaCosta | G06F 3/0482 |
| | | | | 725/41 |
| 2012/0054690 | A1* | 3/2012 | Lim | G06F 3/012 |
| | | | | 715/852 |
| 2012/0139838 | A1* | 6/2012 | Lee et al. | 345/158 |
| 2012/0229377 | A1* | 9/2012 | Kim | G06F 3/017 |
| | | | | 345/157 |
| 2014/0062851 | A1* | 3/2014 | Venon | 345/156 |

\* cited by examiner

*Primary Examiner* — Stephen Hong
*Assistant Examiner* — Hope C Sheffield
(74) *Attorney, Agent, or Firm* — Pierce Atwood LLP

(57) ABSTRACT

A user can navigate through a graphical user interface (GUI) displayed on a display of a computing device using a fingertip or other feature of a hand not holding the device. The interface can be scrolled, zoomed, or otherwise manipulated corresponding to the movement of the fingertip. The user can select a graphical object of the GUI using a thumb or other feature of the hand holding the device, enabling a precise navigation and selection process. Different detection techniques can be used, such as to capture and analyze images to determine the location of the navigation feature and to use capacitive touch sensing elements to detect the selection actions. In some embodiments, a user can perform an attachment action to cause a three-dimensional rendering of an element of the GUI to be adjusted based at least in part upon the position of a fingertip or other feature of the user.

20 Claims, 8 Drawing Sheets

MOTIONS FOR OBJECT RENDERING AND SELECTION

BACKGROUND

People are increasingly relying on portable computing devices for a variety of different tasks. Many of these tasks involve various functions that can be performed with a user navigating to a specific location or interface to select a specific function. Similarly, various instances of content have different pieces of information available from different locations, to which a user has to navigate if the user wishes to view that information. It is often the case, however, that users have difficulty in navigating to specific locations on a touch screen of a portable computing device, as the size of the elements on the display screen are relatively small with respect to the size of the user's finger, such that it can be difficult for the user to accurately select the intended object. Further, if the computing device uses motions or gestures to control the navigation it can be difficult to determine the intent of various gestures, as a user might want to move a finger to scroll to a location and then select an item, zoom into an item, etc., but the software on computing device can have difficulty distinguishing the motions for each of these actions, which can be frustrating for a user when the user has to repeat an action several times or perform different actions to obtain the desired result.

BRIEF DESCRIPTION OF THE DRAWINGS

Various embodiments in accordance with the present disclosure will be described with reference to the drawings, in which.

DETAILED DESCRIPTION

Figure 1A:
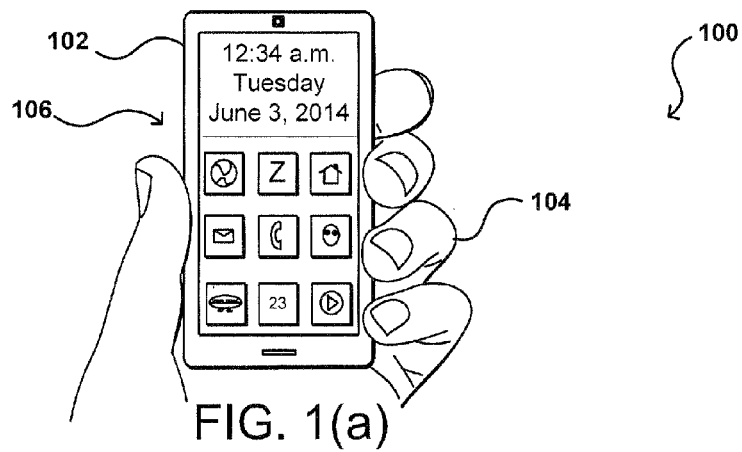
FIGS. 1(*a*), 1(*b*), and 1(*c*) illustrate an example approach to navigating an interface on a portable computing device in accordance with various embodiments.

Approaches in accordance with various embodiments of the present disclosure overcome one or more of the aforementioned and other deficiencies experienced in conventional approaches to providing input to, or determining information for, an electronic device. In particular, approaches discussed herein enable a user to utilize fingertips or other features of both hands to interact with an interface on an electronic device, which can be particularly beneficial for portable devices such as smart phones and portable media players, among other such devices. In at least some embodiments, a user can hold a phone in a first hand, and can use a fingertip of the other hand to navigate through an interface, such as to move relative to the device to cause the interface to scroll, zoom, or otherwise adjust. The fingertip can be at least a distance from the device, and can be imaged using one or more cameras or other sensor(s) of the device. The user can use a thumb or finger of the hand holding the device to select or interact with displayed elements at the current location in the interface, such as by touching the screen or "hovering" over an element for at least a determined period of time. The selection action can be detected using a different element of the computing device than is used for navigation, such as a capacitive touch element or other such component.

In some embodiments the user can utilize the hand not holding the device (or holding the device in some embodiments) to perform an attachment action with respect to an element of the GUI. As discussed herein, an attachment action can include any user interaction with the computing device that creates a virtual association between a particular user interface element or location on the display screen and the fingertip or other feature of the user, or an object being held by the user. For example, the user can contact the screen, hover for a period of time, or perform a gesture to cause an element of the GUI associated with that position to be "attached" to that fingertip or other features of the user's hand. Such virtual "attachment" between the user interface element and the fingertip may be leveraged to display additional or "hidden" portions of the graphical user interface associated with the user interface element based on a movement of the fingertip relative to a virtual "point" of attachment. This "attaching" process can make it appear as if the GUI element is tied to the fingertip via a virtual string. As the user pulls that fingertip away from the device, or translates that finger laterally with respect to the display screen, a three-dimensional rendering of that element can be displayed via the interface. Such an approach can enable the user to view additional content on other sides or regions of that element, as well as to provide additional options or functions that can be performed with respect to that element.

Many other alternatives and variations are described and suggested below in relation to at least some of the various embodiments.

FIG. 1(*a*) illustrates an example situation 100 wherein a user is interacting with a graphical user interface (GUI) 106 rendered on a computing device 102. The computing device 102 can be any appropriate device, such as a smart phone, tablet computer, or personal data assistant, among other such options. In this example, the user is holding the computing device in one of the user's hands 104. If the user wants to navigate through the interface (i.e., a two-dimensional or three-dimensional interface) using a conventional approach, the user would typically touch the screen of the device and swipe the user's thumb in a specific direction in order to scroll the displayed portion of the interface to be able to view the desired content. If the user wants to interact with that content, the user typically has to touch that content using the same thumb in a slightly different way, such a by holding for a period of time. Such approaches can have different levels of sensitivity, and can result in the user inadvertently opening applications or changing the state of the display when trying to scroll, among other such options. Further, a user might attempt to zoom in or out on an object such as an image or a map by swiping two fingers on the screen at the same time, but similar issues can result in similar undesired results. Further, the contact and motion on the screen can occlude the user's view of the screen and make it difficult for the user to interact with the device.

Certain approaches utilize motions or gestures to perform at least some of these actions, but similar issues occur for those approaches as well. For example, a user must move a finger towards the screen to select an object, which can be misinterpreted as a navigation or zoom option that can cause the user to inadvertently select the wrong object. Further, use of motions can cause a device to confuse a zoom with a navigation input, among other such issues.

Accordingly, approaches in accordance with several embodiments utilize a dual-input approach that can overcome at least some of these issues to provide a greater level of control and accuracy over an interface rendered on a computing device. In at least some embodiments a computing device can enable a user to utilize motions or gestures at a distance from the device in order to control navigation actions such as scrolling or zooming, among other such actions. At the same time, the device can utilize a touch or "hover" type input to enable a user to perform actions such as to select an object for viewing, select an application to be launched, and perform other such actions. These approaches complement each other, and enable a user to more accurately and quickly navigate an interface, particularly for an interface of a small, portable computing device such as a smart phone or portable media player.

Figure 1B:
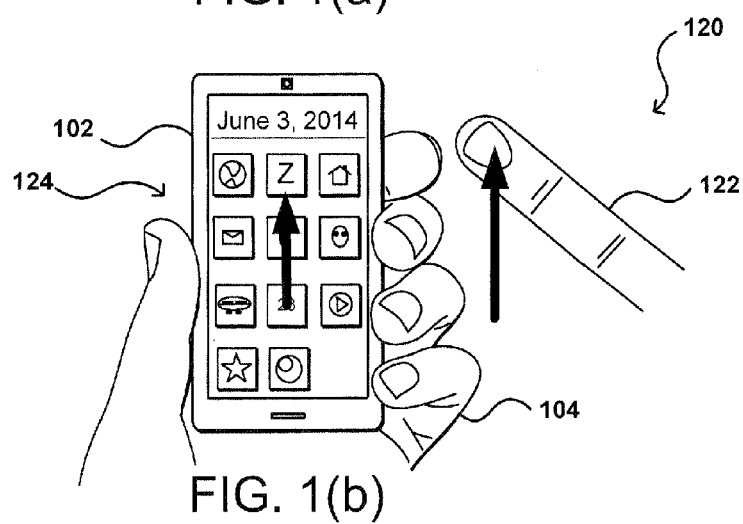
Figure 1C:
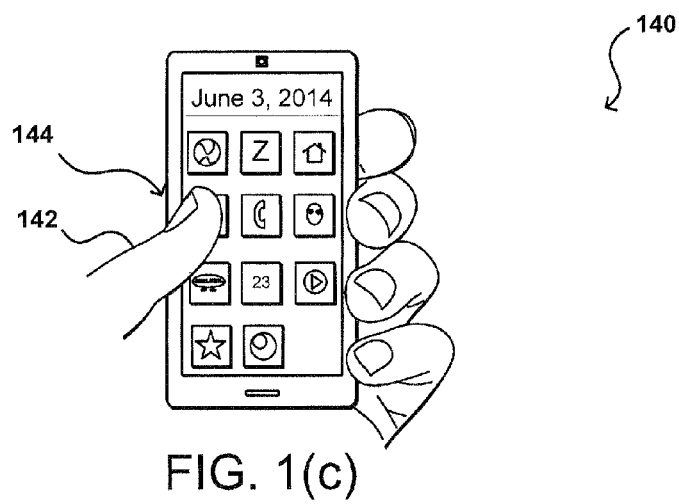

For example, in the situation 120 of FIG. 1(b) a user is able to utilize a feature or object, such as a finger 122 of the hand not holding the device, to move laterally with respect to the display screen of the computing device in order to scroll or otherwise update a display of a GUI on the computing device. In this example the finger 122 is positioned at an appropriate distance from the computing device 102 in order to provide input to the device. The finger is then moved in a direction that is approximately parallel to the screen of the computing device and towards the top of the computing device. As illustrated this causes the interface rendered on the computing device to scroll in an upward direction, to display a second portion 124 of the interface on the display screen. The user can use any appropriate motion to navigate through the interface, such as to move right or left to scroll, flip, or otherwise change to a portion of the interface logically to the right or left of the currently displayed portion. Similarly motions can be made for other interface motions as well, such as to move up and down, diagonally, etc. In at least some embodiment the distance at which the finger 122 is held from the device can control a zoom level of at least a portion of the interface or objects of the interface displayed on the device. For example, a user can move the finger closer to the device to "zoom in" on an object, or cause that object to be expanded on the display screen of the device. Similarly, the user can pull the finger away from the device to zoom out, among other such actions.

As discussed, conventional motion approaches would require a user to also use that finger 122 to select an object on the screen by moving that finger towards the display screen. As discussed, this could cause confusion with a zoom action, and moving the finger all the way to the screen can have some lateral motion which can inadvertently end up in the user selecting the wrong object on the display.

Accordingly, approaches in accordance with various embodiments can use a different approach to enabling a user to select content on the computing device. As an example, in the situation 140 of FIG. 1(c) a user is able to use a thumb 142 or other finger of the hand holding the computing device to select an object 144, element, or portion of the interface displayed on the computing device. The user can select an object by contacting a corresponding location on a touch-sensitive display screen, for example, or in at least some embodiments can "hover" or hold the thumb for a period of time over that portion of the screen, but without contacting the screen, in order to select that object. Such an approach can enable a user to navigate with one hand, and make selections with the other, which can provide a greater level of control and accuracy with respect to interaction with the interface. Further, such approaches enable a user to navigate and select without contacting the display screen of the device, which among other benefits can prevent oil and other contaminants from being placed on the screen through interaction of the user with the screen.

Figure 2A:
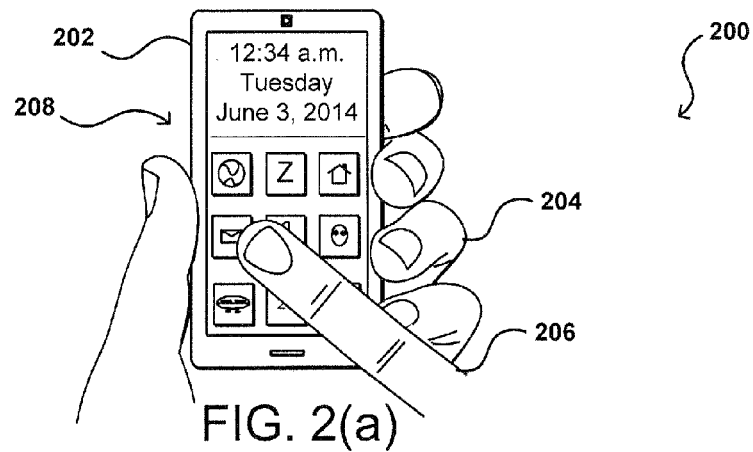
FIGS. 2(*a*), 2(*b*), 2(*c*), 2(*d*), and 2(*e*) illustrate example ways in which a user can obtain additional information from an interface of a portable computing device that can be utilized in accordance with various embodiments.

In some embodiments, the elements rendered as part of an interface can include one or more "three-dimensional" objects that can be manipulated to appear to show different sides of the object on the two- or three-dimensional display screen. As discussed, approaches in accordance with various embodiments can enable a user to use a fingertip or other such object (e.g., an object held by the user) or feature to zoom into specific objects rendered as part of an interface. For example, in the situation 200 of FIG. 2(a), a user is holding the device 202 in one hand 204 and has positioned a finger 206 of the other hand with respect to an object rendered on an interface 208 of the computing device. As discussed above, the user can move the finger closer to and/or further away from the device at that lateral location in order to zoom in or zoom out on the object. In some embodiments, however, the object might be a "three-dimensional" object that has multiple sides or regions that can be rendered on the screen upon some navigation or manipulation of the object. In a traditional zoom approach, the side or region of the object currently displayed would be enlarged, but the user would not be able to see other portions of that object without an additional manipulation of some type, such as to perform an action to rotate that object, etc.

Figure 2B:
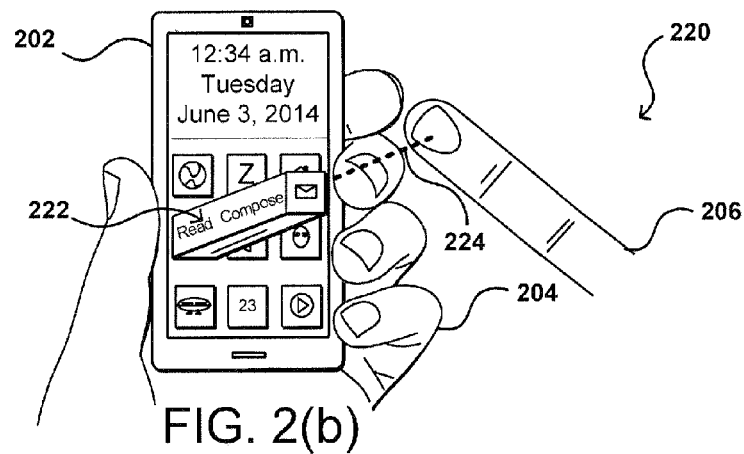

FIG. 2(b) illustrates an example situation 220 in which a user is able to "attach" or "connect" to one of these three-dimensional objects in order to be able to view other sides, portions, or regions of the objects. In this example, the user is able to perform an action with the finger 206 in order to indicate to the computing device that the user is attempting to attach or connect to the object. The action in this example is to hold the finger still with respect to the object for at least a threshold amount of time in order to cause that object to be connected to the finger. Other actions can be performed as well, such as to bring two fingers together in a pinching gesture, using two fingers side by side to indicate the object of interest, state a voice command, etc. In this example, "connecting" to an object causes a virtual string 224 to be connected to the side of the object that is rendered to be facing the user, or currently displayed on the display screen. The interface or device can provide some indication that the object is connected to the finger, such as by playing a short tone, flashing or changing color of the connected object, vibrating using a haptic element, etc.

Once the finger 224 is connected to the object, the user can pull the finger 206 back from the device in order to cause the object to be rendered as if the object is a three dimensional object that is able to be stretched or elongated "out" of the plane of the display screen. If the user pulls straight back from the device, the rendering can appear like a conventional zoom, where the current side of the object is enlarged in the rendering. If, however, the user also pulls the finger laterally with respect to the device, at least one additional side 222 or portion of the element can be displayed. The user can continue to move the finger laterally to view different sides of the object, as if the object is connected by a string and follows the position of the finger. The extent to which an object can be "elongated" can depend upon factors such as the size and resolution of the display screen in at least some embodiments, although in at least some embodiments the user can continue to expand the object until a portion of the object can no longer be rendered, in order to obtain an expanded view of a portion or region of the object. The effect can further be improved for three-dimensional, projection, or holographic displays, among other such elements. If the user is wearing display-capable glasses, the three-dimensional aspects can be "overlaid" over the position of the object on the device using the display-capable glasses. The "string" can be configured to act like a string of a static material, such that the rendered distance adjusted proportionally to the distance the finger is moved, or a string of an "elastic" material, where the amount that the rendering adjusts is a function of the distance which the finger is moved, but might only go to a maximum rendering distance regardless of finger distance, etc.

Figure 2C:
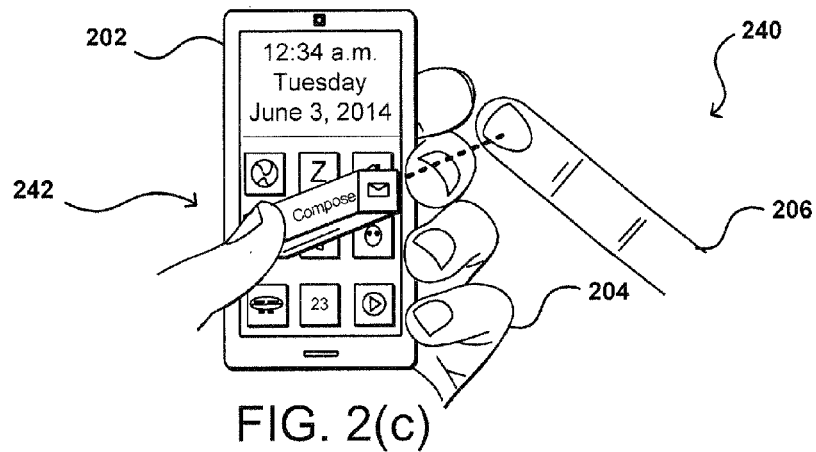

In the example of FIG. 2(b), it can be seen that the object is an application icon, such as for an email application. If the icon has an associated three-dimensional representation, the user can pull out the icon to see options or other information displayed on the sides of the icon. As illustrated in the example situation 240 of FIG. 2(c), the information can include options for that application, such as to read current messages or compose a new message. The user can use the thumb or other finger of the hand 204 holding the device to select one or more of these options 242 to move directly to a state of that application that enables the user to perform the action(s). Similar navigation options can be provided for other types of object as well. For example, if the icon is associated with a Web site, there can be different pages on regions of the associated icon that can enable a user to open a browser directly to that page of the site. If the icon corresponds to a texting application, the user can select options to open the texting application in a state that is ready to text to a specified person. Other navigation actions can be performed as well within the scope of the various embodiments.

Further, various functions can be accessed through such an approach. For example, the icon might correspond to a wireless network control. Upon expanding the icon to view one or more sides of the icon, the user can access options such as to turn off the wireless network, put the device in airplane mode, connect to a specific network, etc. For a media application, the sides can enable the user to access volume controls, playlist options, skip or pause controls, and other such functions. Such options can enable a user to perform specific actions without having to navigate to an open a specific application. A user can instead quickly access controls or functions from the current interface state and cause the corresponding icon or other object to be rendered from a perspective such that the option or function is available.

Figure 2D:
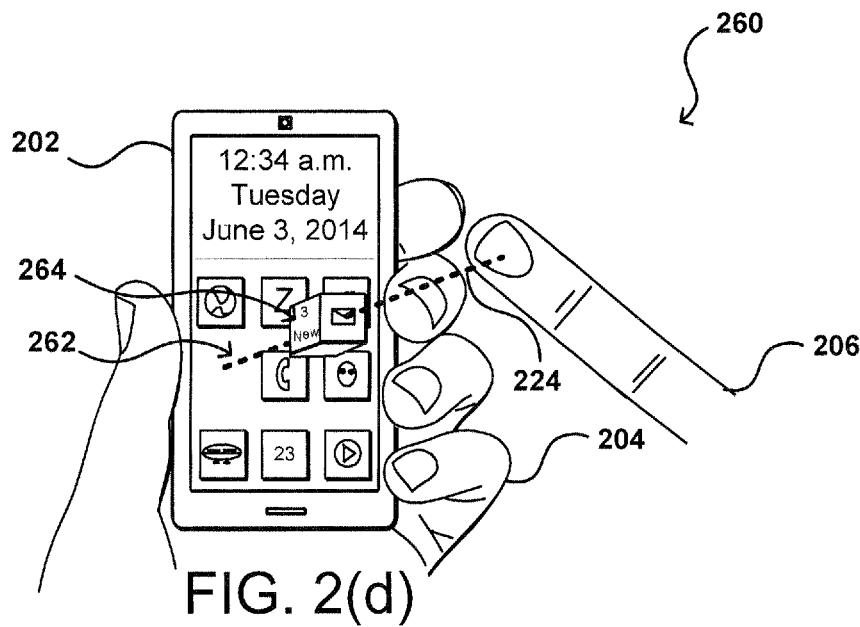
Figure 2E:
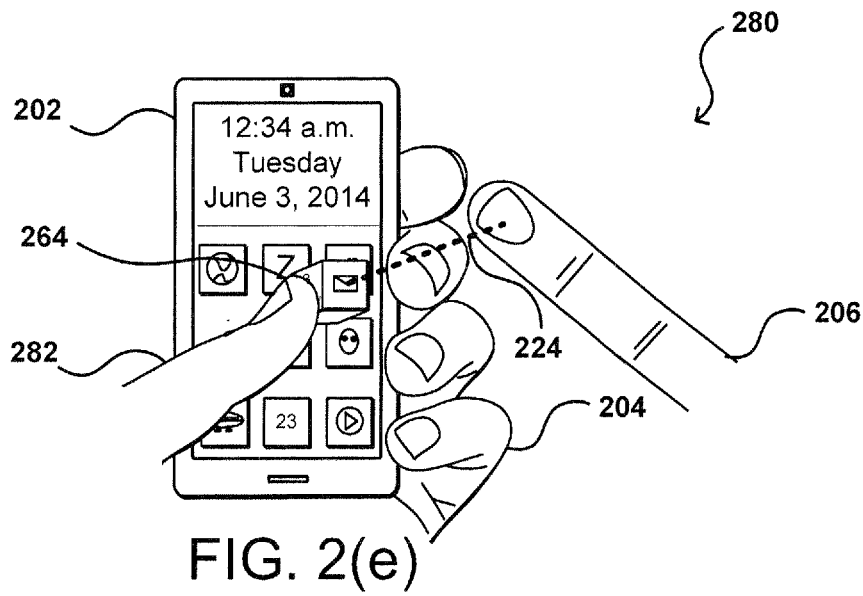

FIG. 2(d) illustrates another example situation 260 wherein the object or icon is not elongated, but is rendered to appear to be moved towards the user. The object 264 selected by a finger 206 in this example still is rendered to move with the finger as if the object is connected to the finger by a virtual string 224. In this example, however, the object has a fixed "depth" or apparent thickness that does not change as the user pulls the finger away from the device. Instead, the object is rendered as if there is a second string 262 tied between a "back" of the selected object and the device. In this way, a user can still move the finger laterally to view different sides of the object, and can pull back to cause the object to be rendered with a larger view, but the object can maintain its intended apparent shape. As illustrated in FIG. 2(e), there can still be options on a side 264 of the object that can be accessed by a thumb 282 or other feature through screen contact or hovering, among other such options discussed elsewhere herein.

Figure 3A:
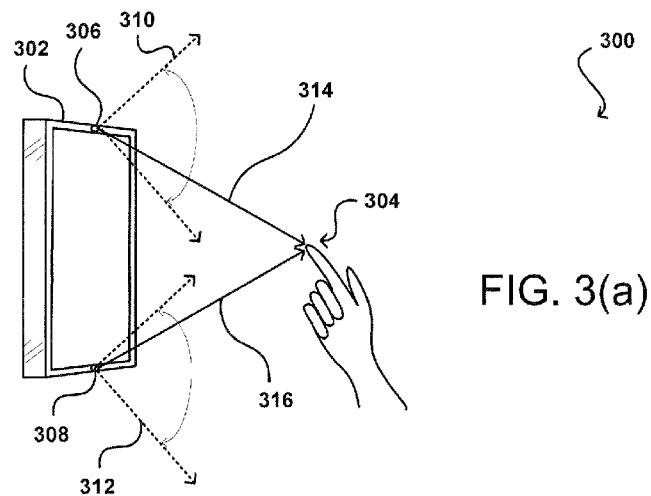
FIGS. 3(*a*), 3(*b*), 3(*c*), and 3(*d*) illustrate an example process for determining location-based device input that can be utilized in accordance with various embodiments.

In order to determine the location of one or more features of the user with respect to a display or other such element of a computing device, a number of potential approaches can be used. FIGS. 3(a), (b), (c), and (d) illustrate one example approach to determining a relative distance and/or location of at least one feature of a user that can be utilized in accordance with various embodiments. In this example, input can be provided to a computing device 302 by monitoring the position of the user's fingertip 304 with respect to the device, although various other features can be used as well as discussed and suggested elsewhere herein. In some embodiments, a single camera can be used to capture image information including the user's fingertip, where the relative location can be determined in two dimensions from the position of the fingertip in the image and the distance determined by the relative size of the fingertip in the image. In other embodiments, a distance detector or other such sensor can be used to provide the distance information. The illustrated computing device 302 in this example instead includes at least two different image capture elements 306, 308 positioned on the device with a sufficient separation such that the device can utilize stereoscopic imaging (or another such approach) to determine a relative position of one or more features with respect to the device in three dimensions. Although two cameras are illustrated near a top and bottom of the device in this example, it should be understood that there can be additional or alternative imaging elements of the same or a different type at various other locations on the device within the scope of the various embodiments. Further, it should be understood that terms such as "top" and "upper" are used for clarity of explanation and are not intended to require specific orientations unless otherwise stated. In this example, the upper camera 306 is able to see the fingertip 304 of the user as long as that feature is within a field of view 310 of the upper camera 306 and there are no obstructions between the upper camera and those features. If software executing on the computing device (or otherwise in communication with the computing device) is able to determine information such as the angular field of view of the camera, the zoom level at which the information is currently being captured, and any other such relevant information, the software can determine an approximate direction 314 of the fingertip with respect to the upper camera. In some embodiments, methods such as ultrasonic detection, feature size analysis, luminance analysis through active illumination, or other such distance measurement approaches can be used to assist with position determination as well.

In this example, a second camera is used to assist with location determination as well as to enable distance determinations through stereoscopic imaging. The lower camera 308 in FIG. 3(a) is also able to image the fingertip 304 as long as the feature is at least partially within the field of view 312 of the lower camera 308. Using a similar process to that described above, appropriate software can analyze the image information captured by the lower camera to determine an approximate direction 316 to the user's fingertip. The direction can be determined, in at least some embodiments, by looking at a distance from a center (or other) point of the image and comparing that to the angular measure of the field of view of the camera. For example, a feature in the middle of a captured image is likely directly in front of the respective capture element. If the feature is at the very edge of the image, then the feature is likely at a forty-five degree angle from a vector orthogonal to the image plane of the capture element. Positions between the edge and the center correspond to intermediate angles as would be apparent to one of ordinary skill in the art, and as known in the art for stereoscopic imaging. Once the direction vectors from at least two image capture elements are determined for a given feature, the intersection point of those vectors can be determined, which corresponds to the approximate relative position in three dimensions of the respective feature.

In some embodiments, information from a single camera can be used to determine the relative distance to a feature of a user. For example, a device can determine the size of a feature (e.g., a finger, hand, pen, or stylus) used to provide input to the device. By monitoring the relative size in the captured image information, the device can estimate the relative distance to the feature. This estimated distance can be used to assist with location determination using a single camera or sensor approach.

Figures 3B, 3C:
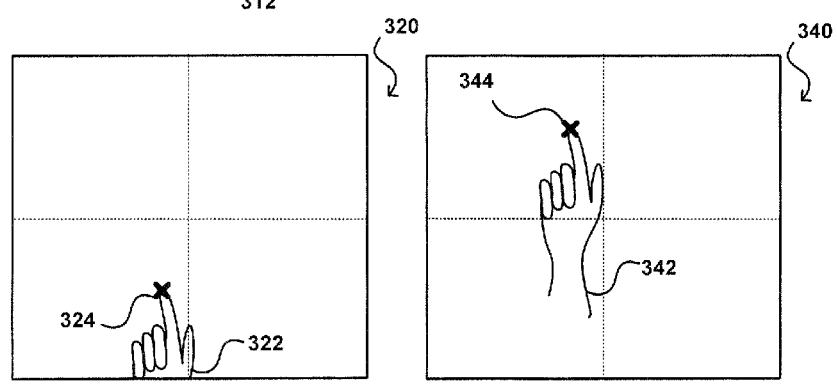

Further illustrating such an example approach, FIGS. 3(b) and 3(c) illustrate example images 320, 340 that could be captured of the fingertip using the cameras 306, 308 of FIG. 3(a). In this example, FIG. 3(b) illustrates an example image 320 that could be captured using the upper camera 306 in FIG. 3(a). One or more image analysis algorithms can be used to analyze the image to perform pattern recognition, shape recognition, or another such process to identify a feature of interest, such as the user's fingertip, thumb, hand, or other such feature. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon identifying the feature, here the user's hand 322, at least one point of interest 324, here the tip of the user's index finger, is determined. As discussed above, the software can use the location of this point with information about the camera to determine a relative direction to the fingertip. A similar approach can be used with the image 340 captured by the lower camera 308 as illustrated in FIG. 3(c), where the hand 342 is located and a direction to the corresponding point 344 determined. As illustrated in FIGS. 3(b) and 3(c), there can be offsets in the relative positions of the features due at least in part to the separation of the cameras. Further, there can be offsets due to the physical locations in three dimensions of the features of interest. By looking for the intersection of the direction vectors to determine the position of the fingertip in three dimensions, a corresponding input can be determined within a determined level of accuracy. If higher accuracy is needed, higher resolution and/or additional elements can be used in various embodiments. Further, any other stereoscopic or similar approach for determining relative positions in three dimensions can be used as well within the scope of the various embodiments.

As can be seen in FIG. 3(a), however, there can be a region near the surface of the screen that falls outside the fields of view of the cameras on the device, which creates a "dead zone" where the location of a fingertip or other feature cannot be determined (at least accurately or quickly) using images captured by the cameras of the device.

Figure 3D:
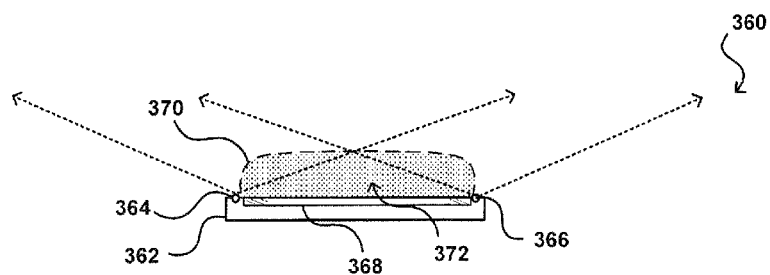

FIG. 3(d) illustrates an example configuration 360 wherein the device 362 includes a pair of front-facing cameras 364, 366 each capable of capturing images over a respective field of view. If a fingertip or other feature near a display screen 368 of the device falls within at least one of these fields of view, the device can analyze images or video captured by these cameras to determine the location of the fingertip. In order to account for position in the dead zone outside the fields of view near the display, the device can utilize a second detection approach, such as by using a capacitive touch detection component as known or used in the art with various touch screens. A capacitive touch detection component can detect position at or near the surface of the display screen, and by adjusting the parameters of the capacitive touch detection component the device can have a detection range 370 that covers the dead zone and also at least partially overlaps the fields of view. Such an approach enables the location of a fingertip or feature to be detected when that fingertip is within a given distance of the display screen, whether or not the fingertip can be seen by one of the cameras. Other location detection approaches can be used as well, such as ultrasonic detection, distance detection, optical analysis, and the like.

Figure 4:
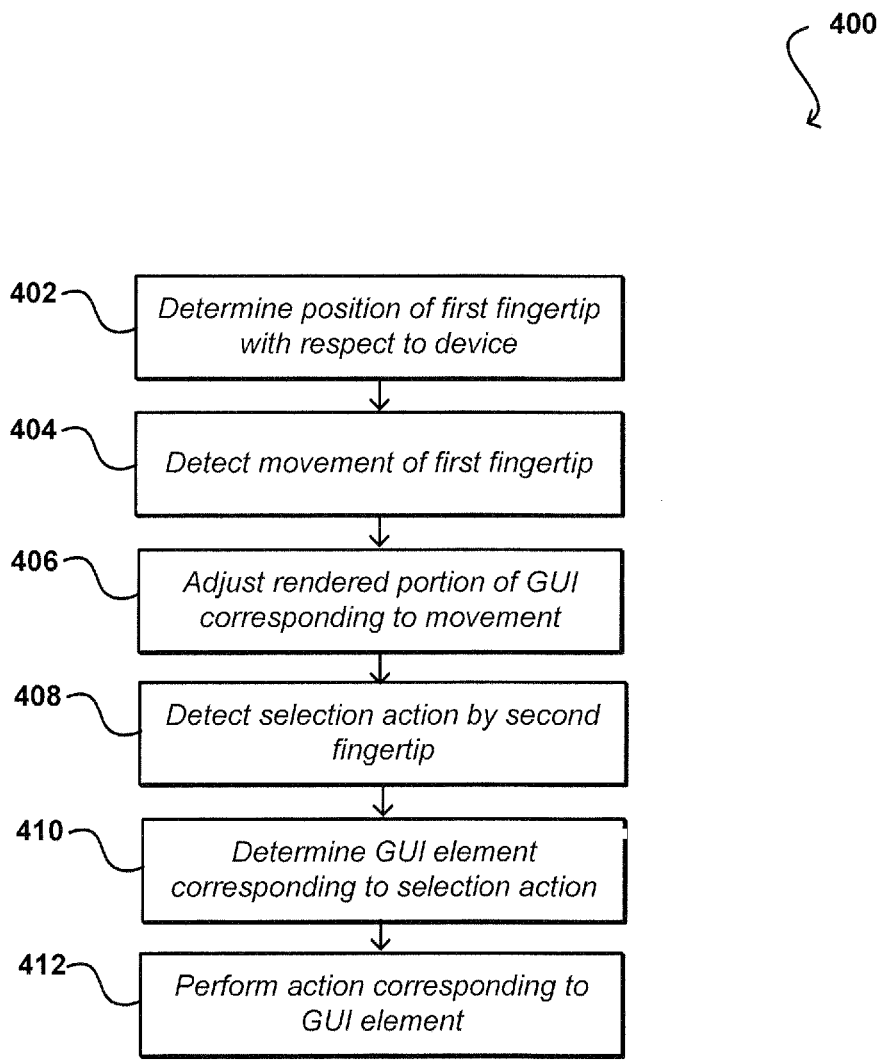
FIG. 4 illustrates an example process for navigating an interface on a computing device that can be utilized in accordance with various embodiments.

FIG. 4 illustrates an example process 400 for providing input to a computing device that can be utilized in accordance with various embodiments. It should be understood, however, that there can be additional, fewer, or alternative steps performed in similar or alternative orders, or in parallel, within the scope of the various embodiments unless otherwise stated. In this example, a position of a first fingertip (or other such feature) is determined 402 with respect to a computing device. As discussed, in at least some embodiments this can involve capturing one or more images, or video, using ambient or infrared light, for example, and analyzing the resulting image data to determine the relative position and/or direction of the fingertip. Upon determining the position, the device can continue to monitor the position until an amount of movement of the fingertip is detected 404, such as an amount that exceeds a minimum amount of movement to trigger a navigation action, as some amount of movement might be allowable based on the difficulty of a human hand to hold completely still while held in the air, etc. In response to detecting the movement, a rendered portion of a graphical user interface (GUI) can be adjusted 406, such as to scroll in a direction corresponding to the direction of the motion, or to zoom in or out corresponding to a change in distance of the fingertip, among other such options discussed herein.

For a currently rendered interface portion, a selection action can be detected 408 for a second fingertip (as may include a thumb or other such feature), as may correspond to a hand of the user that is holding the computing device, or at least a hand other than the one used for the navigation. As discussed, the selection action can occur from the second fingertip contacting a touch screen, hovering in a specific location near the screen as detected by a capacitive touch sensor, performing a specific gesture or motion, etc. An element of the GUI that corresponds to the position of the second fingertip when performing the selection action can be determined 410, and an action corresponding to that element can be performed 412. The action can include any appropriate action or function discussed or suggested herein, such as to launch an application or adjust a setting associated with the element, among other such options.

Figure 5:
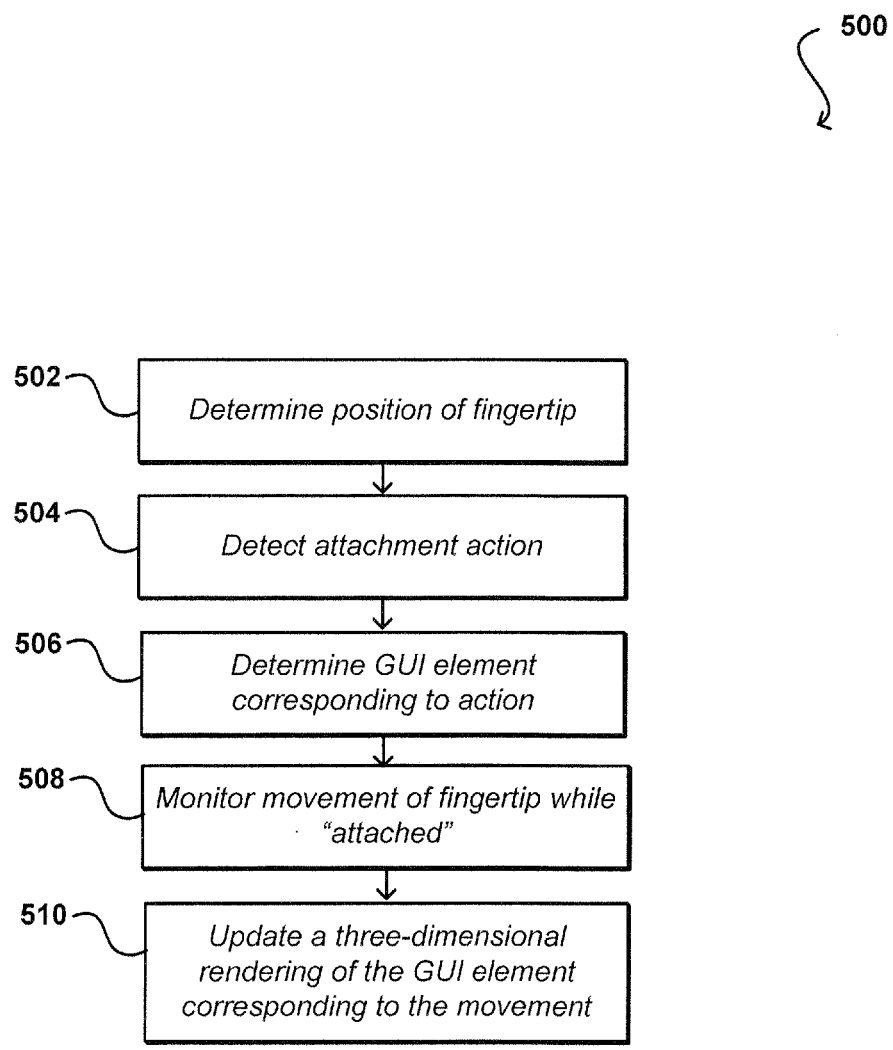
FIG. 5 illustrates an example process enabling a user to access content on a computing device that can be utilized in accordance with various embodiments.

FIG. 5 illustrates another example process 500 that can be used to control the view of a three-dimensional rendering of a graphical object in accordance with various embodiments. In this example, a position of a fingertip is determined 502 relative to a computing device. In at least some embodiments, this fingertip can correspond to the first fingertip discussed with respect to FIG. 4 that is used for interface navigation. The position of the fingertip can be monitored, and at some point an attachment action can be detected 504. As discussed herein, an attachment action can include the fingertip contacting the touch screen or "hovering" over a location on the screen for a period of time, among other such options. An element of the GUI corresponding to the position of the fingertip during the attachment action is determined 506, such as by determining a lateral position of the fingertip with respect to a display screen of the computing device. While the element is "attached" to the fingertip, movement of the fingertip can be monitored 508 and a three-dimensional rendering of the element can be updated 510 based at least in part upon the direction and/or amount of movement of the fingertip. As discussed, there might be options on the sides of the element that the user can select or information on the sides that the user can access. The attachment can continue until a "disconnect" action occurs, such as the user again touching the screen or hovering in a specific location for a period of time, moving a distance away from the display screen, moving laterally away from the display screen, or moving out of a field of view of one or more cameras of the computing device, among other such actions.

As discussed, such interaction can help users navigate through instances of content, particularly on a portable computing device. Such an approach can be useful for applications such as maps, where a user can scroll, zoom, or navigate using a finger on a hand not holding the device, while a finger (including a thumb) on the computing device can select objects, points of interest, destinations, or other such elements on the map or interface. Similarly, a user viewing a gallery or set of images can navigate through the images using one hand and use the thumb of the hand holding the device to select an image for any appropriate purpose. Various other such actions can occur as well within the scope of the various embodiments.

Further, it should be understood that a capacitive or other such approach used to detect selection or attachment actions can also be used to determine the location of the fingertip used for navigation when the fingertip is near the device but moves out of a field of view of one or more cameras on the device. Various other distance or location determining technologies can be used as well.

Figure 6:
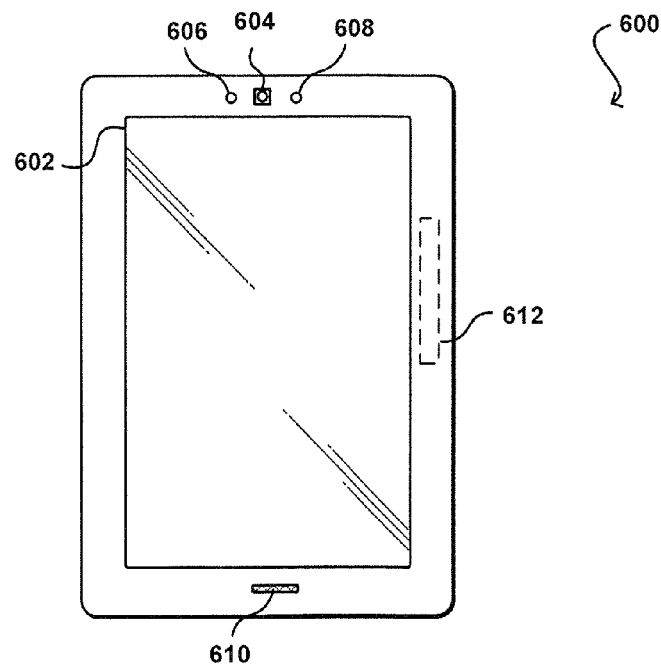
FIG. 6 illustrates an example computing device that can be utilized in accordance with various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 600 has a display screen 602 on the front side, which under normal operation will display information to a user facing the display screen (e.g., on the same side of the computing device as the display screen). The display screen can be a touch sensitive screen that utilizes a capacitive touch-based detection approach, for example, that enables the device to determine the location of an object within a distance of the display screen. The device also includes at least one communication component 612 operable to enable the device to communicate, via a wired and/or wireless connection, with another device, either directly or across at least one network, such as a cellular network, the Internet, a local area network (LAN), and the like. Some devices can include multiple discrete components for communicating over various communication channels.

The computing device in this example includes at least one camera 604 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video. The device also includes a light sensor 606 and an illumination element 608, such as a white light or infrared (IR) LED for providing illumination to assist with image capture based at least in part upon current environmental conditions.

The example computing device 600 also includes at least one microphone 610 or other audio capture device capable of capturing audio data, such as words or commands spoken by a user of the device. In this example, a microphone is placed on the same side of the device as the display screen 602, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

Figure 7:
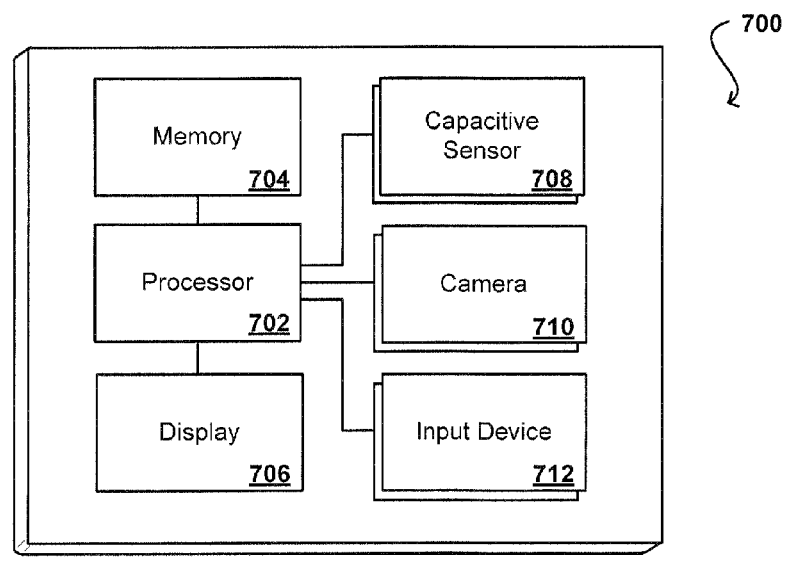
FIG. 7 illustrates an example set of components that can be utilized in a device such as that illustrated in FIG. 6.

FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include one or more cameras or camera sensors 710 for capturing image or video content. Such components can include at least one image capture element such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 700 includes at least one capacitive component 708 or other proximity sensor, which can be part of, or separate from, the display assembly. In at least some embodiments the proximity sensor can take the form of a capacitive touch sensor capable of detecting the proximity of a finger or other such object as discussed herein. The computing device can include one or more communication elements or networking sub-systems, such as a Wi-Fi, Bluetooth, RF, wired, or wireless communication system. The device in many embodiments can communicate with a network, such as the Internet, and may be able to communicate with other such devices. In some embodiments the device can include at least one additional input device 712 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include at least one orientation or motion sensor (not shown). Such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

Figure 8:
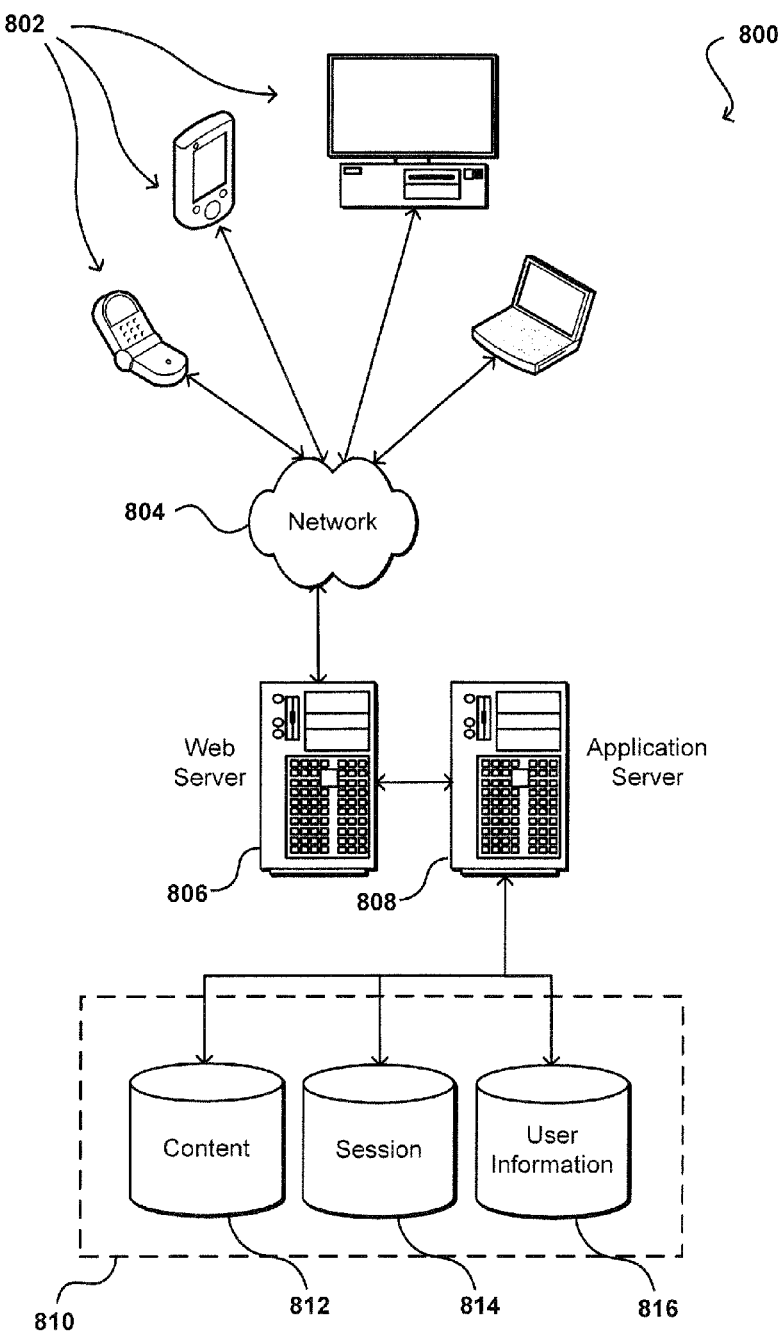
FIG. 8 illustrates an example an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail, Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as JAVA®, C, C# or C++ or any scripting language, such as Perl, Python or TCL, as well as combinations thereof. The server(s) may also include database servers, including without limitation those commercially available from companies such as ORACLE®, MICROSOFT®, SYBASE® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented, comprising:
   presenting a graphical user interface (GUI) on a display screen of a computing device, the GUI comprising graphical objects, the graphical objects including a first graphical object having a first rendering including a first rendered portion at a first position on the GUI;

determining, using at least one camera of the computing device, a first location of a first fingertip relative to the computing device;

detecting an attachment action performed by the first fingertip with respect to the first graphical object, wherein the attachment action is performed without contact between the first fingertip and the display screen;

creating, in response to detecting the attachment action, an association between the first fingertip and the first graphical object;

detecting, while the first fingertip is associated with the first graphical object, movement of the first fingertip to a second location further away from the display screen than the first location;

presenting, on the display screen and in response to detecting the movement, a second rendering of the first graphical object, the second rendering including the first rendered portion at a second position on the GUI, the second rendering further including an elongated second rendered portion extending from the first rendered portion at the second position toward the first position, the second rendered portion including a user-selectable element;

detecting, while the second rendering is presented and while the first fingertip is associated with the first graphical object, a touch of a second fingertip with the user-selectable element; and performing, in response to detecting the touch, an action associated with the user-selectable element.

2. The computer-implemented method of claim 1, wherein presenting the second rendering comprises the second rendering occupying a portion of the GUI previously used to display at least one other graphical object of the graphical objects.

3. The computer-implemented method of claim 1, wherein presenting the second rendering is performed until detecting a disconnect action.

4. The computer-implemented method of claim 1, further comprising:
associating at least one of content or options for actions with each of a plurality of regions of the first graphical object, wherein presenting the second rendering causes different combinations of the regions to be displayed via the second rendering.

5. The computer-implemented method of claim 1, wherein presenting the second rendering includes at least one of rotating, extending, tilting, or moving the first graphical object.

6. A computer-implemented method, comprising:
presenting, via a display screen of a computing device, graphical objects of a graphical user interface (GUI), the graphical objects including a first graphical object having a first rendering including a first rendered portion at a first position on the GUI;
determining a first position of a first fingertip with respect to the computing device;
detecting a gesture performed by the first fingertip with respect to the first graphical object, wherein the gesture is performed without contact between the first fingertip and the display screen;
creating, in response to detecting the gesture, an association between the first fingertip and the first graphical object;

detecting, while the first fingertip is associated with the first graphical object, movement of the first fingertip to a second position further away from the computing device than the first position;

presenting, on the display screen and in response to detecting the movement, a second rendering of the first graphical object, the second rendering including the first rendered portion at a second position on the GUI, the second rendering further including an elongated second rendered portion extending from the first rendered portion at the second position toward the first position, the second rendered portion including a user-selectable element;

detecting, while the second rendering is presented and while the first fingertip is associated with the first graphical object, contact of a second fingertip with a portion of the display screen corresponding to the user-selectable element; and performing, on the computing device and in response to detecting the contact, a function associated with the user-selectable element.

7. The computer-implemented method of claim 6, further comprising:
capturing an image using at least one camera of the computing device,
wherein determining the first position of the first fingertip includes locating a representation of the first fingertip in the image.

8. The computer-implemented method of claim 6, wherein detecting the contact includes analyzing a change in capacitance of a capacitive element associated with the display screen.

9. The computer-implemented method of claim 6, wherein the first rendering is a two-dimensional rendering.

10. The computer-implemented method of claim 6, further comprising:
detecting a disconnect action, wherein no further adjusting of the second rendering is performed after detecting the disconnect action.

11. The computer-implemented method of claim 6, further comprising:
associating at least one of content or options for actions with each of a plurality of regions of the first graphical object,
wherein presenting the second rendering causes different combinations of the regions to be displayed via the second rendering.

12. The computer-implemented method of claim 11, further comprising:
enabling selection of one of the options using the second fingertip.

13. The computer-implemented method of claim 6, wherein the gesture includes at least one of the first fingertip being held in a fixed position with respect to the display screen for at least a determined period of time, or the first fingertip being brought into contact with another fingertip or physical feature of a user.

14. The computer-implemented method of claim 6, wherein presenting the second rendering includes at least one of rotating, extending, tilting, or moving the first graphical object.

15. A computing device, comprising:
at least one processor;
a display screen; and
memory including instructions that, when executed by the at least one processor, cause the computing device to:

present, on the display screen, graphical objects of a graphical user interface (GUI), the graphical objects including a first graphical object having a first rendering including a first rendered portion at a first position on the GUI;

determine a first position of a first fingertip with respect to the computing device;

detect a gesture performed by the first fingertip with respect to the first graphical object, wherein the gesture is performed without contact between the first fingertip and the display screen;

create, in response to detecting the gesture, an association between the first fingertip and the first graphical object;

detect, while the first fingertip is associated with the first graphical object, movement of the first fingertip to a second position further away from the computing device than the first position;

present, on the display screen and in response to detecting the movement, a second rendering of the first graphical object, the second rendering including the first rendered portion at a second position on the GUI, the second rendering further including an elongated second rendered portion extending from the first rendered portion at the second position toward the first position, the second rendered portion including a user-selectable element;

detect, while the second rendering is presented and while the first fingertip is associated with the first graphical object, contact of a second fingertip with a portion of the display screen corresponding to the user-selectable element; and perform, on the computing device and in response to detecting the contact, a function associated with the user-selectable element.

16. The computing device of claim 15, further comprising:
a camera configured to capture an image,
wherein the instructions causing the computing device to determine the first position further include instructions to locate a representation of the first fingertip in the image.

17. The computing device of claim 15, further comprising:
a capacitive sensor configured to sense a change in capacitance near the display screen,
wherein the instructions causing the computing device to detect the contact further include instructions to analyze a change in capacitance of the capacitive sensor.

18. The computing device of claim 15, wherein the instructions causing the computing device to present the second rendering further include instructions to perform at least one of rotating, extending, tilting, or moving of the first graphical object.

19. The computer-implemented method of claim 1, wherein the first rendering is a two-dimensional rendering.

20. The computer-implemented method of claim 6, wherein the second rendering appears attached to the first position.

* * * * *